Patented Feb. 21, 1950

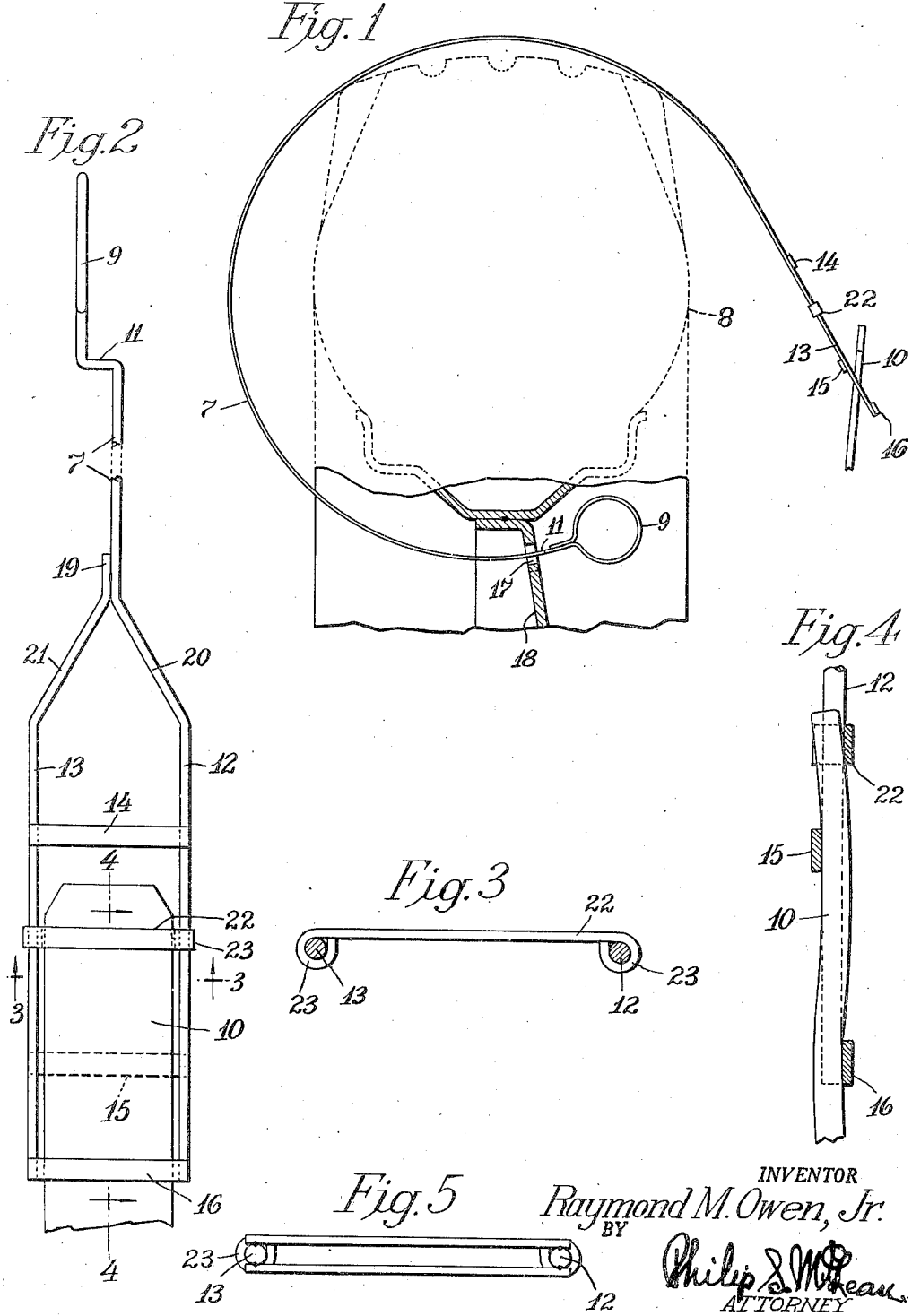

2,497,956

UNITED STATES PATENT OFFICE 2,497,956

TIRE STRAP PULLER

Raymond M. Owen, Jr., Greenwich, Conn.

Application July 1, 1946, Serial No. 680,566

3 Claims. (Cl. 81—15.8)

The invention here disclosed relates to devices for pulling anti-skid straps about automobile tires.

These straps, of necessity, are heavy, thick and relatively stiff. The openings in the wheels through which they must be passed usually are in the form of narrow slots not much larger than the cross section of the straps.

Quite frequently these narrow strap slots are curved to the contour of the wheel. This further complicates the problem of pulling the straps into position about the tire.

The general objects of the present invention are to provide a simple, inexpensive form of puller which can be readily used to draw an anti-skid element about a tire.

Particular objects are to provide such a tool which while thin, flat and small enough to pass through the strap slots, will grip the strap firmly and securely and will be strong enough to surely draw the strap through the opening provided for the same.

Further special objects are to provide a grip for the end of the strap which can be easily manipulated, both to take hold of the strap in the first instance and to release the strap when it has accomplished its purpose.

Especially it is a purpose of the invention to provide a holder or grip in which the stiff, unwieldy strap may be readily engaged, even under adverse weather conditions, such as would require the handling of the device with gloved hands.

Other objects of the invention are to provide a device as indicated which will be of a unitary character, with no loose or separated parts which might become lost and which will take up but small storage space so that it may be carried without inconvenience in a car.

Other desirable objects and the novel features through which the purposes of the invention are attained are set forth or will appear in the course of the following specification.

The drawing accompanying and forming part of the specification illustrates a present practical embodiment of the invention. Structure, however, may be modified and changed in various ways, all within the broad scope of the invention as hereinafter defined and claimed.

Fig. 1 in the drawing is a part sectional and somewhat diagrammatical illustration showing how the device is threaded through a strap slot in a wheel to carry the grip portion about the tire into position for engagement of the end of the strap therewith;

Fig. 2 is a broken plan view of the device, on a larger scale;

Fig. 3 is a further enlarged cross sectional view as on substantially the plane of line 3—3 of Fig. 2;

Fig. 4 is a longitudinal sectional view on substantially the plane of line 4—4 of Fig. 2;

Fig. 5 is an end view of the grip portion of the device.

As shown in Figs. 1 and 2, the device consists, in the main, of a length of strong, stiff wire 7, curved longitudinally to loop about a tire 8, having a handle portion 9 at one end by which it may be manipulated, and provided at the opposite end with a quick releasable grip for a non-skid element such as the strap indicated at 10 in Figs. 2 and 4.

The handle is shown provided by the formation of the end of the wire into a ring and by giving the wire near the ring a transverse bend or offset 11, providing a certain amount of leverage for gripping the wire and shifting the device angularly in various directions to fit it about the tire and in pulling it back after the strap is attached.

The grip portion of the device is shown as made up of parallel sections 12 and 13 of the wire, spaced apart a slightly greater distance than the width of the strap and rigidly secured in such spaced relation by a top bar 14 welded or otherwise secured across the wires at one side, an intermediate bar 15 secured across the wires at the opposite side and an end bar 16 secured across the wires at the first mentioned side.

These three cross bars may be and preferably are, of flat material so as not to add much to the over-all thickness of the device, and secured in the alternating order described they constitute, with the side wires, a flat, stiff, rigid, narrow frame which will readily pass through the short narrow slot 17 in the wheel 18.

One of the side wires, such as 12, may be an integral continuation of the main length of wire and the other side wire, 13, be connected with the main length as by means of a welded joint indicated at 19.

The two parallel lengths of wire are shown connected with the main portion by short, convergent lengths 20, 21, which may operate as wedges to center the grip portion of the device in entering and passing through a strap slot.

Slidably mounted on the side wires, between the upper and intermediate fixed bars 14, 15, is a longitudinally shiftable strap end engaging bar 22 disposed on the same side of the grip frame as the upper bar 14.

The slide 22 is shown as made of the same flat bar stock as the fixed cross bars and as slidably confined on the side wires, by having the ends looped about said wires at 23.

As shown in Fig. 4, the wires forming the frame structure may be of less diameter than the thickness of the strap. This, with the alternate arrangement of the successive cross bars at opposite faces of the frame, assures that the strap will be bent when it is located in the frame in engagement with the lower and intermediate cross bars 16, 15. Then when the slide 22 is pulled downward or outward of the frame, over the end of the strap, the strap will be confined in this relation, bent or crimped about the inner bar 15. The thickness and stiffness of the strap causes it to be firmly and positively gripped in this simple stressed and clamped formation, and the total thickness of the device, with the strap in place, is but slightly greater than the thickness of the strap itself, and hence the device can be used with the narrowest slots found in present car wheels.

The slide bar 22, as indicated in Fig. 4, engages only one face of the strap, leaving the strap free at the opposite side to be cramped over the edge of the fixed bar 15. This slide bar, as evident in this view, does not add anything to the over-all thickness of the device and therefore does not interfere with the free passage through the strap slot, even the arcuately curved type of strap slot.

The cross bars 15 and 16 are spaced widely enough for the end of the strap to be readily inserted therebetween, as by passing the strap upwardly, in Fig. 1, between such bars. After being fully entered, as into the position indicated in this view, the upper end of the strap may be bent inward over the bar 15 far enough to be caught by the slide 22, and the latter then lowered down over such end to bind the strap in such bent position, substantially indicated in the larger view, Fig. 4. In pulling the grip portion through the slot, if the slide catches momentarily on the edge of the slot it will simply be forced into more firmly holding engagement over the end of the strap.

The freedom of entry of the strap between the grip bars and into engagement with the slide, permits use of the device with straps having metal tips or with straps having badly raveled and thickened ends. This grip further will hold straps of different thicknesses and may be readily opened, closed and manipulated with gloves on.

While the body of the device is shown made up of circular section wire, it is contemplated that the wire used may be of square, flat, oval or other cross section. The parts which make up the device may be all of the same or different wire or bar stock.

The device can be readily produced at low cost and takes up but small space.

The longitudinal curvature of the wire, as shown in Fig. 1, is such that the wire, starting with the strap gripping end, can be passed inward through the slot in the wheel and easily looped about the tire to a point where the end of the strap can be readily caught in the grip, in about the position indicated in this view. In working the puller about the tire and in pulling it out with the strap attached, the wire may be bent more or less, but preferably it is sufficiently heavy and springy to yield and to come back more or less to its original curvature.

The ring 9 and the offset 11 provide grips enabling both hands to be used in rocking the puller one way or another to feed the device about the tire in the first place, and in the second place to manipulate it one way or another to guide the grip with the end of the strap held therein fairly into and through the slot.

The end portion of the strap is held flat and firmly in the grip so that turning the device one way or another will accurately position and carry the end of the strap straight and true through the slot without binding or catching. Thus by turning the puller and hence the grip at the end of it, the end of the strap may be turned one way or another to bring it fully into line with the slot.

The offset 11 and the ring 9 at the end of the wire prevent the device from slipping back through the slot when the end of the strap is being secured in the grip. This combined handle construction enables the device to be shifted to various positions for the greater convenience of the operator before and in the act of attaching the chain or strap. The wire can be shifted longitudinally and in various other directions in the slot and rotated to carry the grip into the position where the strap can be most easily attached. This is particularly important in cars having fenders extending well down over the wheels.

What is claimed is:

1. A tire strap puller comprising an elongated pull connection for pulling about a tire and having parallel side portions at the trailing end of the same spaced apart a distance slightly greater than the width of a tire strap and thereby adapted to have the leading end of a tire strap inserted therebetween, a cross bar connecting the ends of said spaced-apart portions, a second cross bar connecting said spaced-apart portions spaced from the ends of said spaced-apart portions and over which the end of an inserted strap may be bent and a slide bar longitudinally shiftable along the side portions adjacent the edge of said second cross bar which is remote from the end of said side portions and thereby adapted to be slid over the end of a strap bent over the second cross bar to confine the strap in its position engaged between the side portions.

2. A tire strap puller comprising an elongated pull connection for pulling about a tire and having parallel side portions at the trailing end of the same spaced apart a distance slightly greater than the width of a tire strap and thereby adapted to have the leading end of a tire strap inserted therebetween, a cross bar connecting the ends of said spaced-apart portions, a second cross bar connecting said spaced-apart portions spaced from the ends of said spaced-apart portions and over which the end of an inserted strap may be bent and a slide bar longitudinally shiftable along the side portions adjacent the edge of said second cross bar which is remote from the end of said side portions and thereby adapted to be slid over the end of a strap bent over the second cross bar to confine the strap in its position engaged between the side portions, said end cross bar and the slide bar being disposed at one face of said side portions and the second cross bar being disposed at the opposite face of said side portions and said side portions being of less thickness than the strap to be held therebetween and whereby the strap will be confined by the cross bars and slide in a crimped condition over the second cross bar.

3. A tire strap puller comprising an elongated pull connection for pulling about a tire and having parallel side portions at the trailing end of the same spaced apart a distance slightly greater than the width of a tire strap and thereby adapted to have the leading end of a tire strap inserted therebetween, a cross bar connecting the ends of said spaced-apart portions, a second cross bar connecting said spaced-apart portions spaced from the ends of said spaced-apart portions and over which the end of an inserted strap may be bent, a slide bar longitudinally shiftable along the side portions adjacent the edge of said second cross bar which is remote from the end of said side portions and thereby adapted to be slid over the end of a strap bent over the second cross bar to confine the strap in its position engaged between the side portions and a third cross bar connecting the side portions further from the end of the same than the slide bar for maintaining them in spaced relation and for limiting the upward sliding movement of the slide bar away from the second cross bar.

RAYMOND M. OWEN, Jr.

REFERENCES CITED

The following references are of record in the file of this patent:

UNITED STATES PATENTS

| Number | Name | Date |
| --- | --- | --- |
| 1,487,395 | Maltby | Mar. 18, 1924 |
| 2,212,267 | Hudson | Aug. 20, 1940 |
| 2,222,891 | Ransom | Nov. 26, 1940 |
| 2,257,657 | Spahr | Sept. 30, 1941 |
| 2,328,680 | Royer | Sept. 7, 1943 |